(12) United States Patent
Imes et al.

(10) Patent No.: US 12,706,992 B2
(45) Date of Patent: Aug. 11, 2026

(54) BUILDING MANAGEMENT SYSTEM WITH ETHERNET CABLING FOR BUILDING DEVICES

(71) Applicant: Tyco Fire & Security GmbH, Neuhausen am Rheinfall (CH)

(72) Inventors: Ezra M. Imes, Pewaukee, WI (US); Daniel Hjortland, Milwaukee, WI (US); Abigail Strand, Boca Raton, FL (US); Bruce Hoeppner, Cedarburg, WI (US); Christopher P. Brophy, Cedarburg, WI (US)

(73) Assignee: Tyco Fire & Security GmbH, Neuhausen am Rheinfall (CH)

( * ) Notice: Subject to any disclaimer, the term of this patent is extended or adjusted under 35 U.S.C. 154(b) by 25 days.

(21) Appl. No.: 18/760,976

(22) Filed: Jul. 1, 2024

(65) Prior Publication Data

US 2026/0006109 A1 Jan. 1, 2026

(51) Int. Cl.
*H04L 69/18* (2022.01)
*H04L 67/12* (2022.01)
*H04L 69/08* (2022.01)
*H04L 69/22* (2022.01)

(52) U.S. Cl.
CPC .............. *H04L 69/18* (2013.01); *H04L 67/12* (2013.01); *H04L 69/08* (2013.01); *H04L 69/22* (2013.01)

(58) Field of Classification Search
CPC ......... H04L 69/08; H04L 12/66; H04L 69/18; H04L 69/22; H04L 67/12
See application file for complete search history.

(56) References Cited

U.S. PATENT DOCUMENTS 6,259,363 B1 * 7/2001 Payne .................. G08B 29/043 340/508
6,638,088 B1 * 10/2003 Richardson ............ H01R 33/08 439/242
9,746,199 B1 8/2017 Drees et al.
11,920,816 B2 * 3/2024 Atchison ................ G05B 15/02
2008/0244104 A1 * 10/2008 Clemente .......... H04L 12/40013 710/11
2013/0089210 A1 * 4/2013 Martin .................... H04M 9/08 381/81
2013/0328677 A1 * 12/2013 Czarnecki ................ G08B 1/08 340/539.1
2014/0185600 A1 * 7/2014 Cheng ..................... H04L 49/35 370/338
2017/0048085 A1 * 2/2017 Munoz .................. H04L 5/0007
2017/0357607 A1 12/2017 Cayemberg et al.
2018/0115633 A1 * 4/2018 Dhanawade ...... H04L 12/40169

(Continued)

*Primary Examiner* — Tonia L Dollinger
*Assistant Examiner* — Linh T. Nguyen
(74) *Attorney, Agent, or Firm* — Foley & Lardner LLP

(57) ABSTRACT

A first building device is for use with a building system of a building. The building system includes second building devices coupled by an Ethernet cable. At least one of the second building devices is coupled to the first building device. The first building device includes transceivers which are configured for a respective one of a number of protocols. The first device also includes one or more circuits configured to connect to the Ethernet cable, determine a protocol for the second building devices, select a transceiver based upon the protocol, and communicate with the second building devices using the transceiver and the protocol.

20 Claims, 8 Drawing Sheets

(56) References Cited

U.S. PATENT DOCUMENTS

| | | | |
|---|---|---|---|
| 2018/0187909 | A1 | 7/2018 | Drees et al. |
| 2018/0238577 | A1 | 8/2018 | Drees et al. |
| 2018/0239371 | A1 | 8/2018 | Drees et al. |
| 2018/0314219 | A1 | 11/2018 | Gamroth et al. |
| 2019/0013023 | A1 | 1/2019 | Pourmohammad et al. |
| 2019/0116480 | A1* | 4/2019 | Schultz .................. H04L 43/08 |
| 2019/0147883 | A1 | 5/2019 | Mellenthin et al. |
| 2020/0097429 | A1* | 3/2020 | Kiener ................ G06F 13/4027 |
| 2022/0113750 | A1* | 4/2022 | Dhadwal ................ H01G 11/18 |
| 2024/0156174 | A1* | 5/2024 | Cahan ..................... A24F 40/65 |
| 2024/0332946 | A1* | 10/2024 | Eriksen ................ H02H 1/0015 |
| 2025/0036185 | A1* | 1/2025 | Zhang .................. G06F 1/3228 |
| 2025/0359089 | A1* | 11/2025 | Suraj Prakash ........ H10D 1/692 |

* cited by examiner

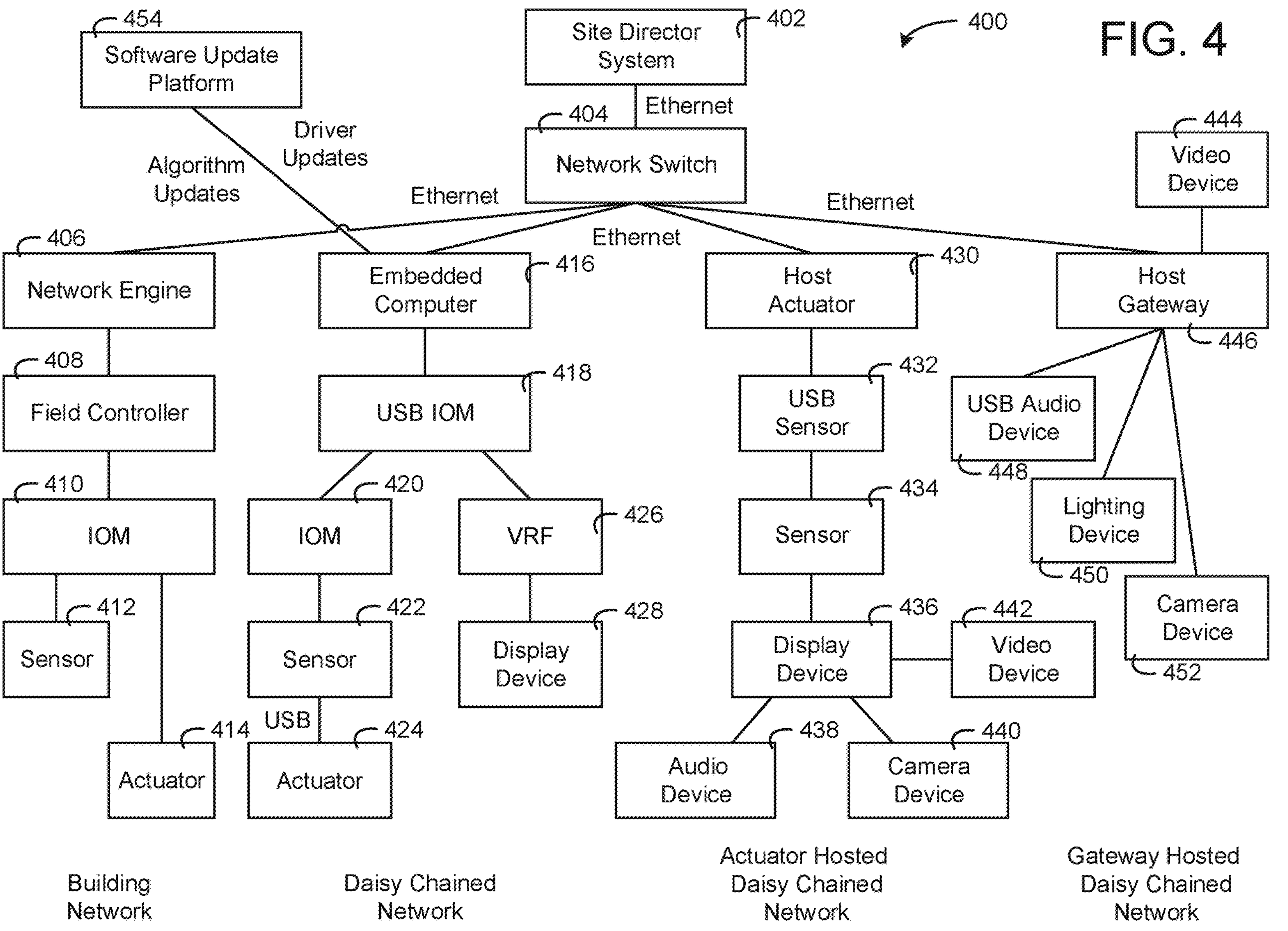
FIG. 4
400
Software Update Platform
454
Site Director System
402
Ethernet
Network Switch
404
Driver Updates
Algorithm Updates
Ethernet
Ethernet
Ethernet
Video Device
444
Network Engine
406
Embedded Computer
416
Host Actuator
430
Host Gateway
446
Field Controller
408
USB IOM
418
USB Sensor
432
USB Audio Device
448
IOM
410
IOM
420
VRF
426
Sensor
434
Lighting Device
450
Sensor
412
Sensor
422
Display Device
428
Display Device
436
Video Device
442
Camera Device
452
USB
Actuator
414
Actuator
424
Audio Device
438
Camera Device
440
Building Network
Daisy Chained Network
Actuator Hosted Daisy Chained Network
Gateway Hosted Daisy Chained Network

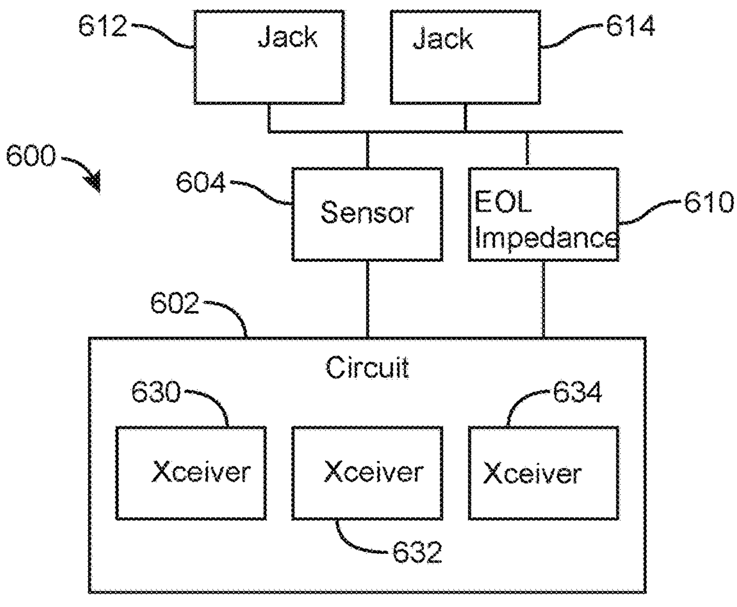
FIG. 6
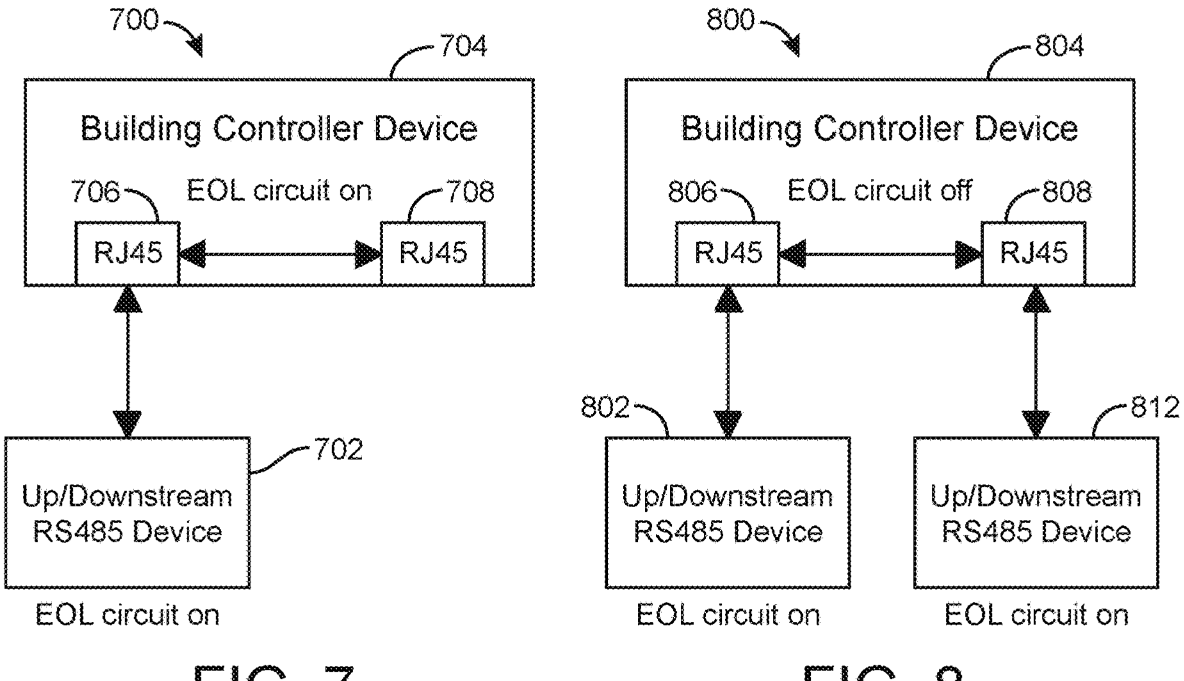
FIG. 7
FIG. 8

BUILDING MANAGEMENT SYSTEM WITH ETHERNET CABLING FOR BUILDING DEVICES

CROSS-REFERENCE TO RELATED PATENT APPLICATION

This application is related to U.S. patent application Ser. No. 16/890,808, filed on Jun. 2, 2020, which claims the benefit of and priority to U.S. Provisional Patent Application No. 62/857,118 filed on Jun. 4, 2019, the entire disclosure of which is incorporated by reference herein.

BACKGROUND

The present disclosure relates generally to interfaces, connectors, wiring and/or cabling including but not limited to interfaces, connectors, wiring and/or cabling in building management systems.

A building management system (BMS) is, in general, a system of devices configured to control, monitor, and manage equipment in or around a building or building area. A BMS can include a heating, ventilation, or air conditioning (HVAC) system, a security system, a lighting system, a fire alerting system, a life safety system, another system that is capable of managing building functions or devices, or any combination thereof. BMS devices may be installed in any environment (e.g., an indoor area or an outdoor area) and the environment may include any number of buildings, spaces, zones, rooms, or areas. A BMS may include METASYS® or VERASYS® building controllers or other devices sold by Johnson Controls, Inc., as well as building devices and components from other sources. Building devices can communicate using wiring or cabling.

SUMMARY

One implementation of the present disclosure relates to a first building device for a building system of a building. The building system includes second building devices coupled by an Ethernet cable. At least one of the second building devices is coupled to the first building device. The first building device includes transceivers which are configured for a respective one of a number of protocols. The first device also includes one or more circuits configured to connect to the Ethernet cable, determine a protocol for the second building devices, select a transceiver based upon the protocol, and communicate with the second building devices using the transceiver and the protocol.

In some embodiments, the transceivers are internal transceivers.

In some embodiments, the first building device is a controller including a pair of jacks. In some embodiments, the first building device a sensor or actuator including a pair of jacks. In some embodiments, the first building device is an air handler unit (AHU) package including a pair of jacks. In some embodiments, the jacks are RJ12, or RJ45 jacks. In some embodiments, the jacks are configured to receive a plug associated with the Ethernet cable.

In some embodiments, the one or more circuits is configured to determine an end of line status for the first device and engage an end of line circuit in response to the end of line status. In some embodiments, the first building device further includes a sensor configured to provide a sense signal indicative of the end of line status. In some embodiments, the first building device further includes a sensor configured to sense the protocol by sensing a type of plug connected to the jacks.

One implementation of the present disclosure relates to a first building device for a building system of a building. The building system includes second building devices coupled by an Ethernet cable. At least one of the second building devices is coupled to the first building device. The first building device includes an end of line circuit, and one or more circuits configured to connect to the Ethernet cable, determine an end of line status for the first building device, and engage the end of line circuit in response to the end of line status.

In some embodiments, the first building device further includes a pair of jacks for connecting to the Ethernet cable. In some embodiments, the first building device further includes a sensor configured to provide a sense signal indicative of a connection to the Ethernet cable. In some embodiments, the sense signal is provided by a switch disposed in one of the jacks. In some embodiments, the end of line circuit includes a resistive network coupled to at least one of the jacks. In some embodiments, the resistive network includes a shunt resistor, a pull up resistor and a pull down resistor.

One implementation of the present disclosure relates to method. The method includes determining, using a first building device, a protocol for communicating with second building devices in a building system of a building. The second building devices are coupled by an Ethernet cable, and at least one of the second building devices is coupled to the first building device. The method also includes selecting a transceiver from transceivers of the first building device based upon the protocol. The transceivers each are configured for a respective protocol. The method also includes communicating with the at least one of the second building devices using the transceiver and the protocol.

In some embodiments, the method also includes determining an end of line status for the first building device, and engaging an end of line circuit in response to the end of line status. In some embodiments, the Ethernet cable is coupled to at least one of a pair of jacks on the first device. In some embodiments, the Ethernet cable is coupled to at least one of a pair of terminal block on the first device.

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

FIG. 4 is a block diagram of a BMS network including building devices, according to an exemplary embodiment.

FIG. 6 is a block diagram of an EOL system for the building devices illustrated in FIGS. 1-5, according to some embodiments.

FIG. 7 is a block diagram of a BMS network with a building controller and one upstream/downstream device, according to some embodiments.

FIG. 8 is a block diagram of a BMS network with a building controller and two upstream/downstream devices, according to some embodiments.

DETAILED DESCRIPTION

Overview

Figure 1:
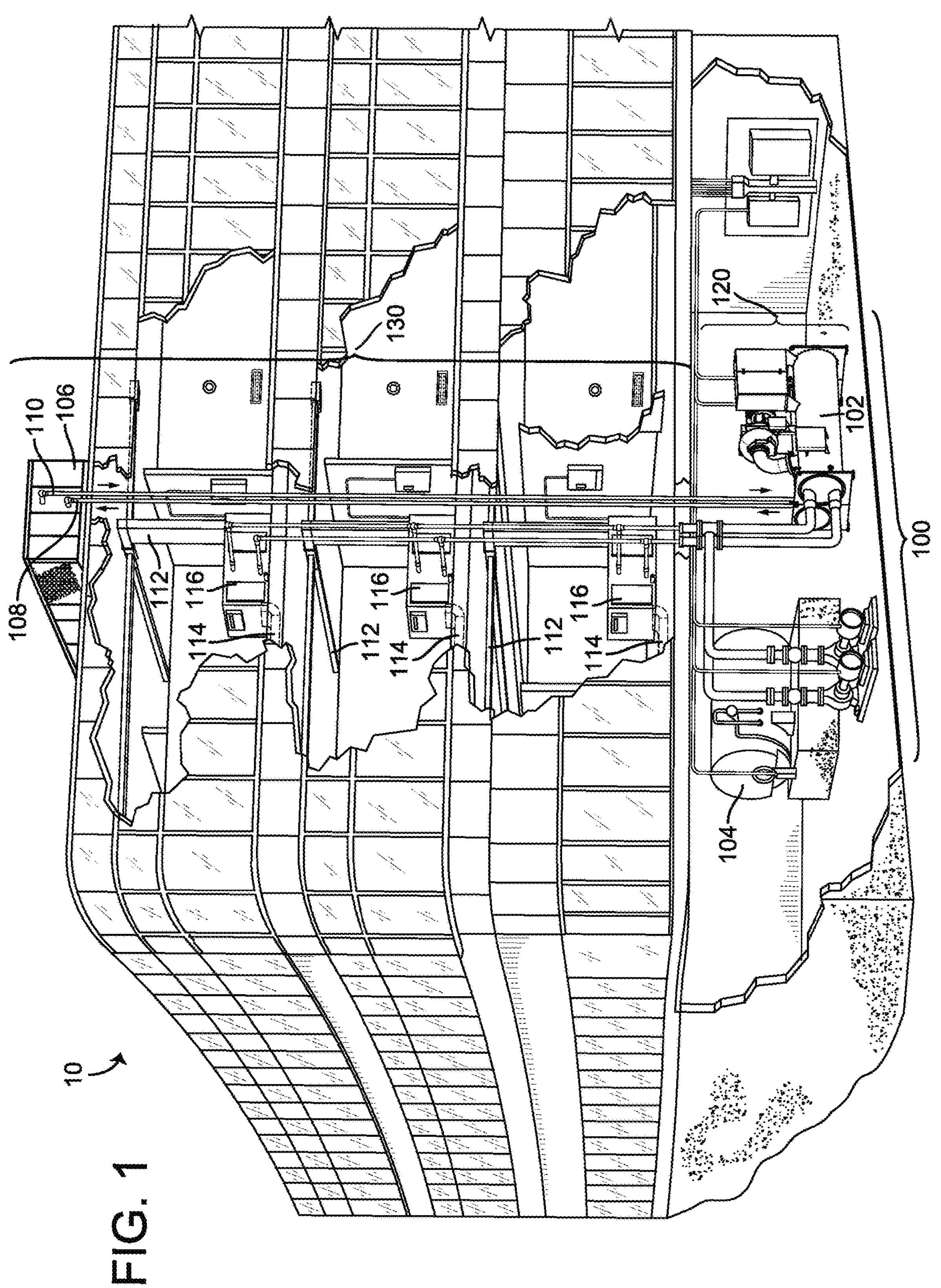
FIG. 1 is schematic drawing of a building equipped with a heating, ventilating, and air conditioning (HVAC) system, according to an exemplary embodiment.

Referring generally to the FIGURES, systems and methods for connecting building devices (equipment and controllers) for communication can use Ethernet cabling according to various exemplary embodiments. In some embodiments, building devices are connected using RS 485 (BACnet/MSTP) protocol over Ethernet cable (e.g. CAT 5e). The building devices can be any type of computer or hardware and software components and combinations thereof used for monitoring, controlling, and managing various systems within a building. Building devices include but are not limited to sensors (e.g., temperature, humidity, occupancy, lighting levels, air quality, thermostats, etc.), actuators, valves, controllers, air handing units, roof top units, human machine interfaces (HMIs), supervisory control and data acquisition (SCADA) systems, energy meters, security equipment, fire and life safety equipment, gateways, repeaters, and access control systems, access control systems, cameras, alarm systems, lighting systems, user devices, etc.

In some embodiments, a workflow involves replacing all existing cabling (e.g. Belcan twisted pair wires) with Ethernet cable. Installing and using Ethernet cable advantageously allows for a smooth transition to IP connectivity in the near future for customers. In some embodiments, the building devices include wired RS485 communication termination interfaces or jacks (e.g., a female socket) that receive plugs (e.g., a male connector on the end of a cable). In some embodiments, a jack receives an RJ12 plug (e.g., six conductor plug in interfaces). In some embodiments, the Ethernet cable includes an RJ45 connector or plug. The RJ12 plug is backwards-compatible with the RS485 jack or communication termination interface, and the pinout of the RJ45 connectors can accommodate RJ12 termination connection interfaces or jacks and still support standard Ethernet cable RJ45 termination connections. In some embodiments, retrofits are minimally impacted because RJ12 or RJ45 connectors are both configured to work with an RJ45 termination connection. In some embodiments, terminal blocks are used as connection interfaces.

In some embodiments, the systems and methods detect which connector type is plugged into the jack or connection termination and automatically select an appropriate internal transceiver circuit. In some embodiments, a detector includes one or more physical switches in the connector that is actuated by one or both connector types. In some embodiments, a circuit detects the type of signals present on the cable pins and selects the appropriate internal transceiver after a brief evaluation period following the plug-in operation.

In some embodiments, an Ethernet is wired using screw terminals or an RJ45 breakout board or adapter. In some embodiments, controllers with include a dual vertical (non-magnetic) RJ45 connector interface pair. The interface pair can be provided at minimal cost and space impact (e.g., as Metasys Gen 5 hardware). In some embodiments, crimped Ethernet RJ45 terminations with internal pass-through wiring to multi-drop nodes without any node termination field wiring is used. In some embodiments, material and labor cost can be 2% higher than conventional field controller (FC) bus connection and 11% lower than conventional sensor actuator (SA) bus installations.

In some embodiments, an end of line (EOL) circuit automatically configures the device for an end of line configuration if the device is an end of line device. An end of line device is a device does not provide a physical connection to more than one other device. The end of line circuit senses for an end of line status and provides the appropriate impedance for the connection to the device with an end of line status. The impedance matches the impedance of the line in some embodiments. The end of line circuit can engage a resistive network to provide the appropriate impedance. In some embodiments, the resistive network includes a pull up resistor (e.g., 1200 Ohms), a pull down resistor (e.g., 1200 Ohms), and a shunt resistor (e.g., 220 Ohms).

The building devices can include two or more jacks or connectors for connecting to a cable or wiring. If only a single connection is used, an end of line status exists. End of line status can be sensed using a microswitch in the connectors, by measuring impedance, by providing polling signals to determine the number of connections made to the device, etc. An embedded controller, circuit, or processor can analyze signals and/or responses to determine the status in some embodiments. An embedded controller, circuit, or processor can engage or disengage an impedance network to provide proper impedance for the end of line status in some embodiments.

Building and HVAC System

Referring now to FIG. 1, an exemplary building and HVAC system in which the systems and methods can be implemented are shown, according to some embodiments. In FIG. 1, a perspective view of a building 10 is shown. Building 10 is served by a HVAC system 100. HVAC system 100 can include HVAC devices (e.g., heaters, chillers, air handling units, pumps, fans, thermal energy storage, etc.) configured to provide heating, cooling, ventilation, or other services for building 10. For example, HVAC system 100 is shown to include a waterside system 120 and an airside system 130. Waterside system 120 can provide a heated or chilled fluid to an air handling unit of airside system 130. Airside system 130 can use the heated or chilled fluid to heat or cool an airflow provided to building 10.

HVAC system 100 is shown to include a chiller 102, a boiler 104, and a rooftop air handling unit (AHU) 106. Waterside system 120 can use boiler 104 and chiller 102 to heat or cool a working fluid (e.g., water, glycol, etc.) and can circulate the working fluid to AHU 106. In various embodiments, the HVAC devices of waterside system 120 can be located in or around building 10 (as shown in FIG. 1) or at an offsite location such as a central plant (e.g., a chiller plant, a steam plant, a heat plant, etc.). The working fluid can be heated in boiler 104 or cooled in chiller 102, depending on whether heating or cooling is required in building 10. Boiler 104 can add heat to the circulated fluid, for example, by burning a combustible material (e.g., natural gas) or using an electric heating element. Chiller 102 can place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 can be transported to AHU 106 via piping 108.

AHU 106 can place the working fluid in a heat exchange relationship with an airflow passing through AHU 106 (e.g., via one or more stages of cooling coils and/or heating coils). The airflow can be, for example, outside air, return air from within building 10, or a combination of both. AHU 106 can transfer heat between the airflow and the working fluid to provide heating or cooling for the airflow. For example, AHU 106 can include one or more fans or blowers configured to pass the airflow over or through a heat exchanger containing the working fluid. The working fluid can then return to chiller 102 or boiler 104 via piping 110.

Airside system 130 can deliver the airflow supplied by AHU 106 (i.e., the supply airflow) to building 10 via air supply ducts 112 and can provide return air from building 10 to AHU 106 via air return ducts 114. In some embodiments, airside system 130 includes multiple variable air volume (VAV) units 116. For example, airside system 130 is shown to include a separate VAV unit 116 on each floor or zone of building 10. VAV units 116 can include dampers or other flow control elements that can be operated to control an amount of the supply airflow provided to individual zones of building 10. In other embodiments, airside system 130 delivers the supply airflow into one or more zones of building 10 (e.g., via supply ducts 112) without using intermediate VAV units 116 or other flow control elements. AHU 106 can include various sensors (e.g., temperature sensors, pressure sensors, etc.) configured to measure attributes of the supply airflow. AHU 106 can receive input from sensors located within AHU 106 and/or within the building zone and can adjust the flow rate, temperature, or other attributes of the supply airflow through AHU 106 to achieve setpoint conditions for the building zone.

Building Management System

Figure 2:
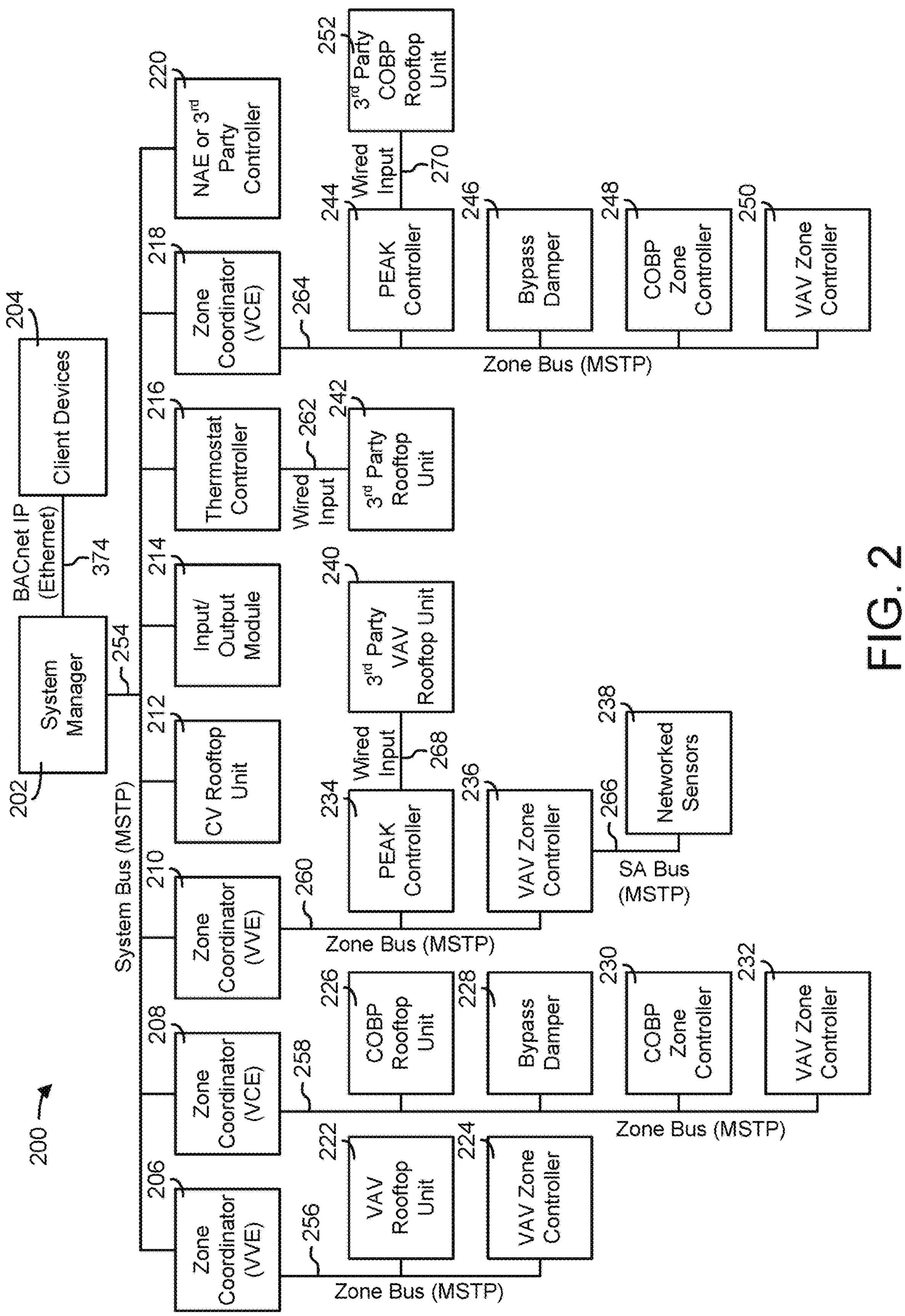
FIG. 2 is a block diagram of a building management system (BMS) which can be used to monitor and control the building and HVAC system of FIG. 1, according to an exemplary embodiment.

Referring now to FIG. 2, a block diagram of a building management system (BMS) 200 is shown, according to an exemplary embodiment. A BMS is, in general, a system of devices configured to control, monitor, and manage equipment in or around a building or building area. A BMS can include, for example, a HVAC system, a security system, a lighting system, a fire alerting system, any other system that is capable of managing building functions or devices, or any combination thereof. BMS 200 can be used to monitor and control the devices of HVAC system 100 and/or airside system 130 (e.g., HVAC equipment) as well as other types of BMS devices (e.g., lighting equipment, security equipment, etc.).

In brief overview, BMS 200 provides a system architecture that facilitates automatic equipment discovery and equipment model distribution. Equipment discovery can occur on multiple levels of BMS 200 across multiple different communications busses (e.g., a system bus 254, zone buses 256-260 and 264, sensor/actuator bus 266, etc.) and across multiple different communications protocols. In some embodiments, equipment discovery is accomplished using active node tables, which provide status information for devices connected to each communications bus. For example, each communications bus can be monitored for new devices by monitoring the corresponding active node table for new nodes. When a new device is detected, BMS 200 can begin interacting with the new device (e.g., sending control signals, using data from the device) without user interaction.

Some devices in BMS 200 present themselves to the network using equipment models. An equipment model defines equipment object attributes, view definitions, schedules, trends, and the associated BACnet value objects (e.g., analog value, binary value, multistate value, etc.) that are used for integration with other systems. An equipment model for a device can include a collection of point objects that provide information about the device (e.g., device name, network address, model number, device type, etc.) and store present values of variables or parameters used by the device. For example, the equipment model can include point objects (e.g., standard BACnet point objects) that store the values of input variables accepted by the device (e.g., setpoint, control parameters, etc.), output variables provided by the device (e.g., temperature measurement, feedback signal, etc.), configuration parameters used by the device (e.g., operating mode, actuator stroke length, damper position, tuning parameters, etc.). The point objects in the equipment model can be mapped to variables or parameters stored within the device to expose those variables or parameters to external systems or devices.

Some devices in BMS 200 store their own equipment models. Other devices in BMS 200 have equipment models stored externally (e.g., within other devices). For example, a zone coordinator 208 can store the equipment model for a bypass damper 228. In some embodiments, zone coordinator 208 automatically creates the equipment model for bypass damper 228 or other devices on zone bus 258. Other zone coordinators can also create equipment models for devices connected to their zone busses. The equipment model for a device can be created automatically based on the types of data points exposed by the device on the zone bus, device type, and/or other device attributes. Several examples of automatic equipment discovery and equipment model distribution are discussed in greater detail below.

Still referring to FIG. 2, BMS 200 is shown to include a system manager 202; several zone coordinators 206, 208, 210 and 218; and several zone controllers 224, 230, 232, 236, 248, and 250. System manager 202 can communicate with client devices 204 (e.g., user devices, desktop computers, laptop computers, mobile devices, etc.) via a data communications link 374 (e.g., BACnet IP, Ethernet, wired or wireless communications, etc.). System manager 202 can provide a user interface to client devices 204 via data communications link 374. The user interface may allow users to monitor and/or control BMS 200 via client devices 204.

In some embodiments, system manager 202 is connected with zone coordinators 206-210 and 218 via a system bus 254. System bus 254 can include any of a variety of communications hardware (e.g., wire, optical fiber, terminals, etc.) configured to facilitate communications between system manager and other devices connected to system bus 254. Throughout this disclosure, the devices connected to system bus 254 are referred to as system bus devices. System manager 202 can be configured to communicate with zone coordinators 206-210 and 218 via system bus 254 using a master-slave token passing (MSTP) protocol or any other communications protocol. System bus 254 can also connect system manager 202 with other devices such as a constant volume (CV) rooftop unit (RTU) 212, an input/output module (IOM) 214, a thermostat controller 216 (e.g., a TEC2000 series thermostat controller), and a network automation engine (NAE) or third-party controller 220. RTU 212 can be configured to communicate directly with system manager 202 and can be connected directly to system bus 254. Other RTUs can communicate with system manager 202 via an intermediate device. For example, a wired input 262 can connect a third-party RTU 242 to thermostat controller 216, which connects to system bus 254.

System manager 202 can provide a user interface for any device containing an equipment model. Devices such as zone coordinators 206-210 and 218 and thermostat controller 216 can provide their equipment models to system manager 202 via system bus 254. In some embodiments, system manager 202 automatically creates equipment models for connected devices that do not contain an equipment model (e.g., IOM 214, third party controller 220, etc.). For example, system manager 202 can create an equipment model for any device that responds to a device tree request. The equipment models created by system manager 202 can be stored within system manager 202. System manager 202 can then provide a user interface for devices that do not contain their own equipment models using the equipment models created by system manager 202. In some embodiments, system manager 202 stores a view definition for each type of equipment connected via system bus 254 and uses the stored view definition to generate a user interface for the equipment.

Each zone coordinator 206-210 and 218 can be connected with one or more of zone controllers 224, 230-232, 236, and 248-250 via zone buses 256, 258, 260, and 264. Zone busses 256, 258, 260, and 264 can include any of a variety of communications hardware (e.g., wire, optical fiber, terminals, etc.) configured to facilitate communications between a zone coordinator and other devices connected to the corresponding zone bus. Throughout this disclosure, the devices connected to zone busses 256, 258, 260, and 264 are referred to as zone bus devices. Zone coordinators 206-210 and 218 can communicate with zone controllers 224, 230-232, 236, and 248-250 via zone busses 256-260 and 264 using a MSTP protocol or any other communications protocol. Zone busses 256-260 and 264 can also connect zone coordinators 206-210 and 218 with other types of devices such as variable air volume (VAV) RTUs 222 and 240, changeover bypass (COBP) RTUs 226 and 252, bypass dampers 228 and 246, and PEAK controllers 234 and 244.

Zone coordinators 206-210 and 218 can be configured to monitor and command various zoning systems. In some embodiments, each zone coordinator 206-210 and 218 monitors and commands a separate zoning system and is connected to the zoning system via a separate zone bus. For example, zone coordinator 206 can be connected to VAV RTU 222 and zone controller 224 via zone bus 256. Zone coordinator 208 can be connected to COBP RTU 226, bypass damper 228, COBP zone controller 230, and VAV zone controller 232 via zone bus 258. Zone coordinator 210 can be connected to PEAK controller 234 and VAV zone controller 236 via zone bus 260. Zone coordinator 218 can be connected to PEAK controller 244, bypass damper 246, COBP zone controller 248, and VAV zone controller 250 via zone bus 264.

A single model of zone coordinator 206-210 and 218 can be configured to handle multiple different types of zoning systems (e.g., a VAV zoning system, a COBP zoning system, etc.). Each zoning system can include an RTU, one or more zone controllers, and/or a bypass damper. For example, zone coordinators 206 and 210 are shown as Verasys VAV engines (VVEs) connected to VAV RTUs 222 and 240, respectively. Zone coordinator 206 is connected directly to VAV RTU 222 via zone bus 256, whereas zone coordinator 210 is connected to a third-party VAV RTU 240 via a wired input 268 provided to PEAK controller 234. Zone coordinators 208 and 218 are shown as Verasys COBP engines (VCEs) connected to COBP RTUs 226 and 252, respectively. Zone coordinator 208 is connected directly to COBP RTU 226 via zone bus 258, whereas zone coordinator 218 is connected to a third-party COBP RTU 252 via a wired input 270 provided to PEAK controller 244.

Zone controllers 224, 230-232, 236, and 248-250 can communicate with individual BMS devices (e.g., sensors, actuators, etc.) via sensor/actuator (SA) busses. For example, VAV zone controller 236 is shown connected to networked sensors 238 via SA bus 266. Networked sensors 238 can include, for example, temperature sensors, humidity sensors, pressure sensors, lighting sensors, security sensors, or any other type of device configured to measure and/or provide an input to zone controller 236. Zone controller 236 can communicate with networked sensors 238 using a MSTP protocol or any other communications protocol. Although only one SA bus 266 is shown in FIG. 2, it should be understood that each zone controller 224, 230-232, 236, and 248-250 can be connected to a different SA bus. Each SA bus can connect a zone controller with various sensors (e.g., temperature sensors, humidity sensors, pressure sensors, light sensors, occupancy sensors, etc.), actuators (e.g., damper actuators, valve actuators, etc.) and/or other types of controllable equipment (e.g., chillers, heaters, fans, pumps, etc.).

Each zone controller 224, 230-232, 236, and 248-250 can be configured to monitor and control a different building zone. Zone controllers 224, 230-232, 236, and 248-250 can use the inputs and outputs provided via their SA busses to monitor and control various building zones. For example, a zone controller 236 can use a temperature input received from networked sensors 238 via SA bus 266 (e.g., a measured temperature of a building zone) as feedback in a temperature control algorithm. Zone controllers 224, 230-232, 236, and 248-250 can use various types of control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control a variable state or condition (e.g., temperature, humidity, airflow, lighting, etc.) in or around building 10. Wiring for the various devices can utilize Ethernet cables and interfaces as discussed below. The interfaces can include RJ 12, RJ 45 (e.g., with T568A and T568B pinouts), RS 485 jacks and plugs and/or screw terminal blocks in some embodiments.

Figure 3:
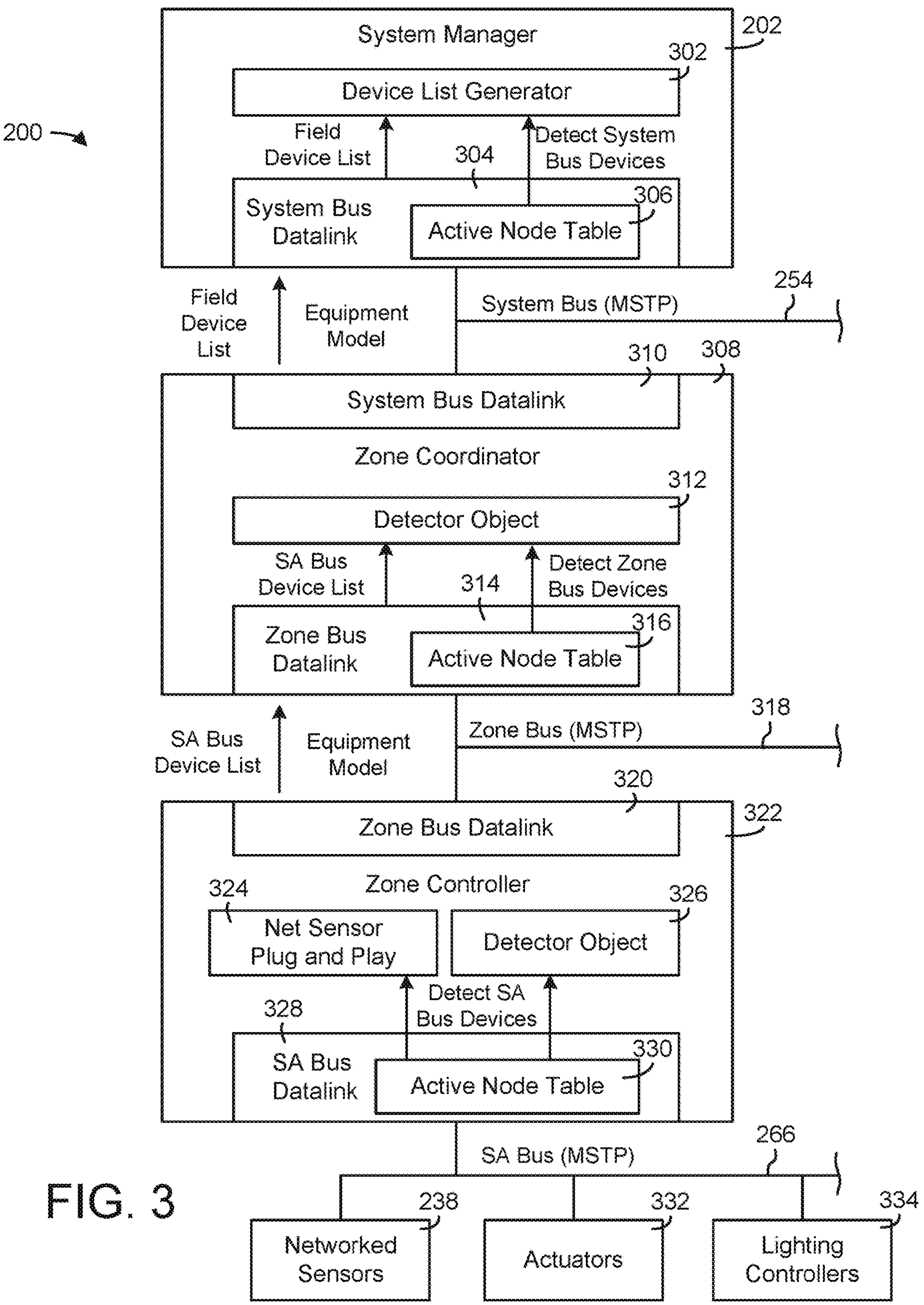
FIG. 3 is a block diagram illustrating a system manager, zone coordinator, and zone controller of the BMS of FIG. 2 in greater detail, according to an exemplary embodiment.

Referring now to FIG. 3, a block diagram illustrating a portion of BMS 200 in greater detail is shown, according to an exemplary embodiment. BMS 200 is shown to include system manager 202, a zone coordinator 308, and a zone controller 322. Zone coordinator 308 can be any of zone coordinators 206-210 or 218. Zone controller 322 can be any of zone controllers 224, 230, 232, 236, 248, or 250. Zone coordinator 308 can be connected with system manager via system bus 254. For example, system bus 254 is shown connecting a first system bus datalink 304 within system manager 202 with a second system bus datalink 310 within zone coordinator 308. Zone coordinator 308 can connected with zone controller 322 via a zone bus 318. For example, zone bus 318 is shown connecting a first zone bus datalink 314 within zone coordinator 308 with a second zone bus datalink 320 within zone controller 322. Zone bus 318 can be any of zone busses 256-260 or 264. Zone controller 322 is connected with networked sensors 238 and actuators 332 via a SA bus 266.

BMS 200 can automatically discover new equipment connected to any of system bus 254, zone bus 318, and SA bus 266. Advantageously, the equipment discovery can occur automatically (e.g., without user action) without requiring the equipment to be placed in discovery mode and without sending a discovery command to the equipment. In some embodiments, the automatic equipment discovery is based on active node tables for system bus 254, zone bus 318, and SA bus 266. Each active node table can provide status information for the devices communicating on a particular bus. For example, the active node table 306 for system bus 254 can indicate which MSTP devices are participating in the token network (e.g., a token ring) used to exchange information via system bus 254. Active node table 306 can identify the devices communicating on system bus 254 by MAC address or other device identifier. Devices that do not participate in the token ring (e.g., MSTP slave devices) can be automatically discovered using a net sensor plug and play (described in greater detail below).

The active node table for each communications bus can be stored within one or more devices connected to the bus. For example, active node table 306 can be stored within system manager 202. In some embodiments, active node table 306 is part of a system bus datalink 304 (e.g., a MSTP datalink) used by system manager 202 to communicate via system bus 254. System manager 202 can subscribe to changes in value of active node table 306 and can receive a notification (e.g., from system bus datalink 304) when a change in active node table 306. In response to a notification that a change in active node table 306 has occurred, system manager 202 can read active node table 306 to detect and identify the devices connected to system bus 254.

In some embodiments, a device list generator 302 within system manager 202 generates a list of the devices connected to system bus 254 (i.e., a device list) based on active node table 306 and stores the device list within system manager 202. The device list generated by system manager 202 can include information about each device connected to system bus 254 (e.g., device type, device model, device ID, MAC address, device attributes, etc.). When a new device is detected on system bus 254, system manager 202 can automatically retrieve the equipment model from the device if the device stores its own equipment model. If the device does not store its own equipment model, system manager 202 can retrieve a list of point values provided by the device. System manager 202 can then use the equipment model and/or list of point values to present information about the connected system bus devices to a user.

The active node tables for each zone bus can be stored within the zone coordinator connected to the zone bus. For example, the active node table 316 for zone bus 318 can be stored within zone coordinator 308. In some embodiments, active node table 316 is part of a zone bus datalink 314 (e.g., a MSTP datalink) used by the zone coordinator 308 to communicate via zone bus 318. Zone coordinator 308 can subscribe to changes in value of active node table 316 and can receive a notification (e.g., from zone bus datalink 314) when a change in active node table 316 occurs. In response to a notification that a change to active node table 316 has occurred, zone coordinator 308 can read active node table 316 to identify the devices connected to zone bus 318.

In some embodiments, a detector object 312 of zone coordinator 308 generates a list of the devices communicating on zone bus 318 (i.e., a device list) based on active node table 316 and stores the device list within zone coordinator 308. Each zone coordinator in BMS 200 can generate a list of devices on the connected zone bus. The device list generated by each zone coordinator 308 can include information about each device connected to zone bus 318 (e.g., device type, device model, device ID, MAC address, device attributes, etc.). When a new device is detected on zone bus 318, the connected zone coordinator 308 can automatically retrieve the equipment model from the device if the device stores its own equipment model. If the device does not store its own equipment model, the connected zone coordinator 308 can retrieve a list of point values provided by the device.

Zone coordinator 308 can incorporate the new zone bus device into the zoning logic and can inform system manager 202 that a new zone bus device has been added. For example, zone coordinator 308 is shown providing a field device list to system manager 202. The field device list can include a list of devices connected to zone bus 318 and/or SA bus 266. System manager 202 can use the field device list and the list of system bus devices to generate a device tree including all of the devices in BMS 200. In some embodiments, zone coordinator 308 provides an equipment model for a connected zone bus device to system manager 202. System manager 202 can then use the equipment model and/or list of point values for the new zone bus device to present information about the new zone bus device to a user.

In some embodiments, the device list generated by each zone coordinator 308 indicates whether system manager 202 should communicate directly with the listed zone bus device (e.g., VAV RTU 222, VAV zone controller 224, etc.) or whether system manager 202 should communicate with the intermediate zone coordinator 308 on behalf of the zone bus device. In some embodiments, system manager 202 communicates directly with zone bus devices that provide their own equipment models, but communicates with the intermediate zone coordinator 308 for zone bus devices that do not provide their own equipment model. As discussed above, the equipment models for zone bus devices that do not provide their own equipment model can be generated by the connected zone coordinator 308 and stored within the zone coordinator 308. Accordingly, system manager 202 may communicate directly with the device that stores the equipment model for a connected zone bus device (i.e., the zone bus device itself or the connected zone coordinator 308).

The active node table 330 for SA bus 266 can be stored within zone controller 322. In some embodiments, active node table 330 is part of the SA bus datalink 328 (e.g., a MSTP datalink) used by zone controller 322 to communicate via SA bus 266. Zone controller 322 can subscribe to changes in value of the active node table 330 and can receive a notification (e.g., from SA bus datalink 328) when a change in active node table 330 occurs. In response to a notification that a change to active node table 330 has occurred, zone controller 322 can read active node table 330 to identify some or all of the devices connected to SA bus 266. In some embodiments, active node table 330 identifies only the SA bus devices participating in the token passing ring via SA bus 266 (e.g., MSTP master devices). Zone controller 322 can include an additional net sensor plug and play (NsPnP) 324 configured to detect SA bus devices that do not participate in the token passing ring (e.g., MSTP slave devices).

In some embodiments, NsPnP 324 is configured to actively search for devices connected to SA bus 266 (e.g., networked sensors 238, actuators 332, lighting controllers 334, etc.). For example, NsPnP 324 can send a "ping" to a preconfigured list of MSTP slave MAC addresses. For each SA bus device that is discovered (i.e. responds to the ping), NsPnP 324 can dynamically bring it online. NsPnP 324 can bring a device online by creating and storing an instance of a SA bus device object representing the discovered SA bus device. NsPnP 324 can automatically populate the SA bus device object with all child point objects needed to collect and store point data (e.g., sensor data) from the newly-discovered SA bus device. In some embodiments, NsPnP 324 automatically maps the child point objects of the SA bus device object to attributes of the equipment model for zone controller 322. Accordingly, the data points provided by the SA bus devices can be exposed to zone coordinator 308 and other devices in BMS 200 as attributes of the equipment model for zone controller 322.

In some embodiments, a detector object 326 of zone controller 322 generates a list of the devices connected to SA bus 266 (i.e., a device list) based on active node table 330 and stores the device list within zone controller 322. NsPnP 324 can update the device list to include any SA bus devices discovered by NsPnP 324. The device list generated by zone controller 322 can include information about each device connected to SA bus 266 (e.g., device type, device model, device ID, MAC address, device attributes, etc.). When a new device is detected on SA bus 266, zone controller 322 can automatically retrieve the equipment model from the device if the device stores its own equipment model. If the device does not store its own equipment model, zone controller 322 can retrieve a list of point values provided by the device.

Zone controller 322 can incorporate the new SA bus device into the zone control logic and can inform zone coordinator 308 that a new SA bus device has been added. Zone coordinator 308 can then inform system manager 202 that a new SA bus device has been added. For example, zone controller 322 is shown providing a SA device list to zone coordinator 308. The SA device list can include a list of devices connected to SA bus 266. Zone coordinator 308 can use the SA device list and the detected zone bus devices to generate the field device list provided to system manager 202. In some embodiments, zone controller 322 provides an equipment model for a connected SA bus device to zone coordinator 308, which can be forwarded to system manager 202. System manager 202 can then use the equipment model and/or list of point values for the new SA bus device to present information about the new SA bus device to a user. In some embodiments, data points provided by the SA bus device are shown as attributes of the zone controller 322 to which the SA bus device is connected. Ethernet wiring or cable can be used for the SA and FC connections.

Additional features and advantages of BMS 200, system manager 202, zone coordinator 308, and zone controller 322 are described in detail in U.S. patent application Ser. No. 15/179,894 filed Jun. 10, 2016, the entire disclosure of which is incorporated by reference herein.

Connection of Building Devices

Referring now to FIG. 4, a system 400 of building devices networked together is shown, according to an exemplary embodiment. The system 400 includes a site director system 402. The site director system 402 can be an on-premises and/or off-premises (e.g., a hybrid system) configured to make high level operational decisions for a building, e.g., the building 10 as described with reference to FIG. 1. In some embodiments, the system 400 is completely on-premises to reduce security risks. The site director system 402 can include one or more processing circuits and/or connected devices. The site director system 402 can be an application and data server (ADS) and/or an extended application and data server (ADX)

The site director system 402 may be an NxE/SNx. For example, building optimization algorithms, high level environmental building control, etc. can be performed by the site director system 402. The site director system 402 can communicate to lower level building devices of the system 400 through a network switch 404 (e.g., an Ethernet switch). The site director system 402 can be configured to communicate with the lower level building devices via Ethernet, e.g., an Ethernet connection between the site director system 402 and the network switch 404 and additional Ethernet connections between the network switch 404 and a network engine 406, an embedded computer 416, a host actuator 430, and a host gateway 446.

In some embodiments, the Ethernet provides power, i.e., power over Ethernet (PoE) to the embedded computer 416, the host actuator 430, and/or the host gateway 446. In this regard, the embedded computer 416, the host actuator 430, and/or the host gateway 446 can be powered via PoE. Furthermore, the connections to the embedded computer 416, the host actuator 430, and/or the host gateway 446 are powered where the original source of power is PoE from the network switch 404, where the network switch 404 is a PoE power source. In some embodiments, the peripheral building devices connected to the embedded computer 416, the host actuator 430, and/or the host gateway 446 communicate and/or are powered via PoE or no POE Ethernet cables. PoE is described in greater detail in U.S. Provisional Patent Application No. 62/852,582 filed May 24, 2019, and U.S. Provisional Patent Application Ser. No. 15/956,914 filed Apr. 19, 2019, the entireties of which are incorporated by reference herein.

The network engine 406 can be configured to facilitate communication between the site director system 402 via a first network protocol (e.g., via Ethernet) and a second network protocol (e.g., via RS485 and/or protocols such as BACnet, CAN, etc.). The network engine 406 may be a Network Automation Engine (NAE). The network engine 406 can be configured to facilitate communicate for the RS485 bus and communication for various controllers, thermostats, and/or any other device configured to communicate via RS485. For example, one device configured to communicate via the RS485 bus is the field controller 408. The field controller 408 can be configured to make control decisions for the actuator 414. In some embodiments, the field controller 408 may make control decisions for the actuator 414 via measurements of a sensor, e.g., the sensor 412. In some embodiments, the sensor 412 and the actuator 414 are part of a system. The system may be an environmental lighting system, a temperature control system, an air handler unit (AHU), a variable air volume (VAV) unit, a chiller system, and/or any other system. The sensor 412 can be configured to measure occupancy, light level, temperature, humidity, air pressure, air flow, sound, and/or any other environmental building condition. The actuator 414 can be a damper, a motor, a valve, a light system, a speaker, and/or any other electrical and/or electromechanical device configured to operate to control an environmental condition of a building.

The field controller 408 may not have a direct interface to the sensor 412 and/or the actuator 414 (or may not be located near the sensor 412 and/or the actuator 414). In this regard, control decisions and/or readings of the sensor 412 and/or the actuator 414 can be communicated between the field controller 408 and the sensor 412 and/or the actuator 414 via the IOM 410. The IOM 410 can be configured to communicate with the field controller 408 via RS485 but may also include direct inputs and/or outputs to the sensor 412 and/or the actuator 414. For example, the IOM 410 can receive a control command from the field controller 408 and, via the physical connection to the actuator 414, command the actuator 414 on behalf of the field controller 408. Similarly, the IOM 410 can receive sensor readings from the sensor 412 via a physical connection between the IOM 410 and the sensor 412, and communicate the sensor readings to the field controller 408 via the RS485 connection.

Instead of (or in addition to) including the network engine 406 and the field controller 408, the system 400 can include the embedded computer 416. The embedded computer 416 can be configured to communicate with the site director system 402 via the Ethernet connection and can be configured to communicate with peripheral building devices, i.e., lower level building devices, via a connection. In some embodiments, the embedded computer 416 is a small form factor embedded computer, e.g., a computer without a fan. In some embodiments, the other types of computers, i.e., non-embedded computers, can be utilized instead or, or in addition to, the embedded computer 416. For example, the computers could be a laptop computer, a desktop computer, and/or any other computer. The embedded computer 416 can be a PC running Windows, Linux, etc. The embedded computer 416 can be an Open Application Server (OAS) PC (e.g., an embedded PC running server software) and/or an N50 PC (e.g., an embedded PC running "N50" software, i.e., NCE software). In some embodiments, because the embedded computer 416 is fan-less, it does not rely on the fan operating, i.e., in some computer systems if the fan fails the computer system may stop operating and controlling the peripheral building devices.

The embedded computer 416 can be configured to generate control decisions. The embedded computer 416 can, via the connection, communicate the control decisions to the peripheral devices via the connection. For example, the embedded computer 416 can be configured to run a control algorithm (e.g., an HVAC algorithm, a lighting algorithm, etc.) and communicate control commands resulting from the control algorithm to the appropriate peripheral building devices via the connection. The peripheral building devices can be sensors, actuators, thermostats, IOMs, lighting systems, audio systems, surveillance systems, badge access systems, door locks, etc. The building devices can be automatically discovered and enumerated as they join the network. Furthermore, in some embodiments, the embedded computer 416 can receive sensor readings (or other feedback data) from the peripheral building devices can perform the control algorithms based on the sensor readings. In some embodiments, the embedded computer 416 performs the control algorithms based on high level settings received via the Ethernet connection from the site director system 402.

The embedded computer 416 may not include physical connections to sensors and/or actuators and may not directly control the sensors and/or actuators. In this regard, the embedded computer 416 may be connected to an IOM 418. The IOM 418 may be similar to the IOM 410 but may communicate with the embedded computer 416 an, via physical connections, instantiate control decisions of the embedded computer 416 received from the embedded computer 416 via the connection.

The IOM 418 can be connected to other peripheral building devices and/or systems. For example, the IOM 418 can be configured to facilitate an RS485 network (e.g., BACnet, CAN, etc.) In this regard, the IOM 418 can facilitate communication between the embedded computer 416 and a variable refrigerant flow (VRF) 426. Furthermore, the IOM 418 can be daisy chained via Ethernet wiring with other peripheral building devices. For example, the IOM 418 can facilitate a connection between the embedded computer 416 and another IOM 420, a sensor 422, and/or an actuator 424. The IOM 420 can be similar to the IOM 418 but expand the physical output of the IOM 418. The sensor 422 and/or the actuator 424 can be similar to the sensor 412 and the actuator 414 but perform communication directly to the embedded computer 416 via Ethernet cabling.

In some embodiments, the peripheral building devices are daisy chained via Ethernet cabling. For example, the IOM 420 can be connected via to the IOM 418, the sensor 422 can be connected to the IOM 420 via Ethernet cabling, and the actuator 424 can be connected to the sensor 422. All of the peripheral building devices can communicate back through the daisy chain to the embedded computer 416. In some embodiments, the VRF 426 includes, and/or is associated with, a display screen daisy chained via Ethernet cabling. For example, the VRF 426 can be connected to a display device 428 via an Ethernet cabling. The embedded computer 416 can facilitate the implementation of any control decisions for the VRF 426 received from a user via the display device 428. The display device 428 can include a liquid crystal display (LCD), a light emitting diode (LED) display, and/or any other display device.

In some embodiments, a host actuator 430 (or sensor) can facilitate communication between the site director system 402 via Ethernet and peripheral building devices via Ethernet cabling. In this regard, the host actuator 430 may be similar to the actuator 414 but may be configured to facilitate multiple network connections, e.g., communicate via Ethernet and perform host operations for peripheral building devices. The host actuator 430 can be a network variable air volume modular assembly (VMA) and/or a network VAV. The site director system 402 can be configured to perform the control algorithms of the embedded computer 416 and communicate the control decisions directly to the peripheral building devices via the host actuator 430. The peripheral devices can use a less powerful processor since the embedded computer 416 handles most of the processing.

The peripheral building devices can be daisy chained together to the host actuator 430. A sensor 432 can be directly connected to the sensor 432 via a connection while a sensor 434 can be connected to the sensor 432 via another Ethernet cabling connection. The sensor 432 and the sensor 434 can be the same as, or similar to, the sensor 422. Furthermore, a display device 436 can be connected to the sensor 434 via Ethernet cabling. The display device 436 can be the same as or similar to the display device 428. The display device 436 can include multiple connections connecting an audio device 438 via a first Ethernet cabling connection, a video device 442 via a second Ethernet cabling connection, and a camera device 440 via a third Ethernet cabling connection.

The video device 442 can be a projector system, a smart whiteboard, a smart television, etc. The audio device 438 can be a speaker and/or microphone implementing, or providing input and output for, a smart assistant (e.g., CORTANA, SIRI). Examples of building audio controlled assistants may be the conversational assistants described in U.S. patent application Ser. No. 16/028,126 filed Jun. 5, 2018, and U.S. patent application Ser. No. 16/246,391 filed May 16, 2019, the entirety of which are incorporated by reference herein. In some embodiments, HDMI data streams can be carried from the network (e.g., from a personal computer connected to the network switch 404 and/or from the site director system 402) to the video device 442 and the video device 442 can be configured to display the HDMI data. Furthermore, the camera device 440 can be a surveillance camera. The display device 436, the video device 442, the audio device 438, and/or the camera device 440 can communicate and be managed via the site director system 402 through the host actuator 430.

In some embodiments, the system 400 includes a host gateway 446. The host gateway 446 can be a box configured to perform gateway operations for peripheral building devices. The host gateway 446 can be configured to communicate with the site director system 402 via an Ethernet connection and further include one or multiple connections for connecting devices to the site director system 402. For example, the host gateway 446 can connect to an audio device 448, a lighting device 450, and a camera device 452. The audio device 448 can be the same as or similar to the audio device 438. The camera device 452 can be the same as or similar to the camera device 440. The lighting device 450 can be a lighting system configured to generate light, e.g., an incandescent lamp, a compact fluorescent lamp, a light emitting diode (LED), etc. In this regard, the connection can carry control data, collected building data, audio data, video data, etc.

Figure 5:
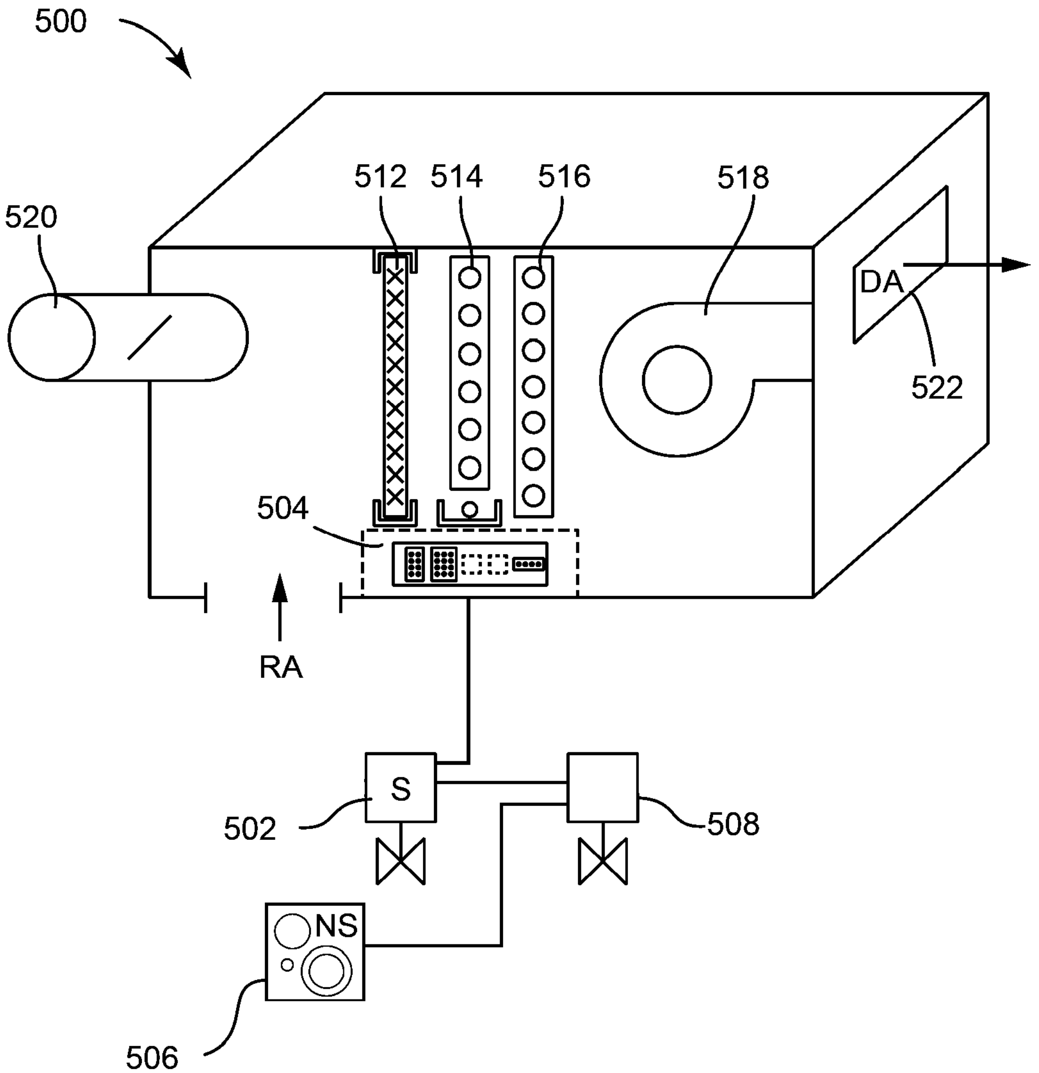
FIG. 5 is a block diagram of sensor and actuator devices in an air handling unit (AHU), according to some embodiments.

Referring now to FIG. 5, a block diagram of an implementation of peripheral building devices in an air handling unit (AHU) 500 is depicted, according to some embodiments. The peripheral building devices can be peripheral devices connected to a host device, e.g., the AHU 500. In this regard, a computer system of the AHU 500 (e.g., the embedded computer 416 and/or the host gateway 446) can act as a host to receive information from, and operate the peripheral building devices (via Ethernet cabling). The embedded computer 416 can be configured to perform one or more control decision for the AHU 500 via the communication with the peripheral devices connected to the embedded computer 416. In some embodiments, the peripheral building devices and the AHU 500 are sold to an end user as a package, i.e., a system suite. Other similar packages of systems may exist for VAVs, chillers, boilers RTUs, etc. This enables a user to purchase a particular equipment package including peripheral building devices and daisy chain the peripheral building devices together to install the networking aspects of the package. Furthermore, the peripheral device is an inexpensive device since the processing work has been transferred to the embedded computer 416.

The AHU 500 is shown to include an actuator device 502 connected to a junction board 504 via a connection. The junction board 504 may be a small two-sided junction board that protrudes through the side of the electrical cabinet of the AHU 500. In addition to the actuator device 502, the junction board 504 may be connected to a network sensor 506 and a hot water valve driven by an actuator 508 via connections, more specifically, a daisy chain of devices using Ethernet cabling. The network sensor 506 may be a thermostat, in some embodiments.

The AHU 500 is further shown to include a filter 512, a chilled water coil 514, a hot water coil 516, and a fan 518 within the AHU electrical cabinet. The chilled water coil 514 may be controlled by the actuator device 502, while the hot water coil 516 may be controlled by a hot water valve or actuator 508. In some embodiments, the AHU 500 may be supplied by outdoor air that is controlled via outdoor air damper 520. Outdoor air may pass through the filter 512 and past the chilled water coil 514 and the hot water coil 516 before exiting the AHU discharge via the fan 518. In some embodiments, the AHU 500 includes a discharge air temperature sensor 522. Measurements from discharge air temperature sensor 522 may be provided to the actuator device 502 and/or the embedded computer 416 which may be located within the AHU 500 and/or external to the AHU 500 and connected via the connections shown connecting to the junction board 504. The operation of the chilled water coil 514 and the hot water coil 516 may be adjusted by the actuator device 502 and the hot water valve or actuator 508 (or the embedded computer 416) based on the discharge temperature feedback from the sensor 522. Examples of smart actuator systems and networked systems are described in greater detail in U.S. patent application Ser. No. 15/901,843 filed Feb. 21, 2018, U.S. patent application Ser. No. 15/399,706 filed Jan. 5, 2017, U.S. patent application Ser. No. 15/685,924 filed Aug. 24, 2017, U.S. patent application Ser. No. 15/901,852 filed Feb. 21, 2018, and U.S. patent application Ser. No. 15/399,706 filed Jan. 5, 2017, the entirety of each of which is incorporated by reference herein.

The connections of the systems 100, 200, 400, and 500 can be any type of Ethernet cabling connection in some embodiments. The connections can terminate using plugs and jacks or terminal blocks. Ethernet cabling can be used for the busses, links, and connections discussed above in some embodiments. The Ethernet cabling can be Cat 4, Cat 5, Cat 6, Cat 7, or Cat 8 cabling in some embodiments. The cabling can include twisted pair conductors (e.g., 4 pairs in a sheath) in some embodiments.

Referring now to FIG. 6, a system 600 can be part of any the building devices discussed above with respect to FIGS. 1-5, according to an exemplary embodiment. The system 600 includes a first terminal or jack 612, a second terminal or jack 614, a sensor 604, an EOL impedance circuit 610, and circuit 602. Circuit 602 includes a set of transceiver such as transceivers 630, 632, and 634. Transceivers 630, 632, and 634 are each configured to operate according to one protocol of several protocols (e.g., BACnet/MSTP, Ethernet, RS-232, RS-485, UART, USART, USB, etc.).

Jacks 612 and 614 are configured to receive Ethernet cable connections or plugs. Sensor 604 is configured to sense whether a connection is made to jack 612, jack 614, or both jacks 612 and 614. Sensor 604 can also be configured to sense what type of protocol is being used on jack 612 and 614. Circuit 602 receives sense signals from sensor 604 and controls EOL impedance provided by EOL circuit 610 based on the sense signal and selects one of transceivers 630, 632, and 634 for the protocol. Sensor 604 can be an assembly of sensors for providing sense signals related to protocol type, connection type, connection status, etc. Sensor 604 can include a separate sensor for each jack 612 and 614 and for each protocol and/or connection type. Jacks 612 and 614 can be terminal blocks in some embodiments.

In some embodiments, circuit 602 detects which connector types are plugged into one or more jacks 612 and 614 and automatically selects an appropriate internal transceiver circuit, such as transceivers 630, 632, and 634. In some embodiments, sensor 604 includes one or more physical switches in jacks 612 and 614 that is actuated by particular connector types. In some embodiments, circuit 602 detects the type of signals present on the cable pins and selects the appropriate transceiver 630, 632, and 634 after a brief evaluation period following the plug-in operation. Transceivers 630, 632, and 634 are each configured for communicating according to a different protocol on an Ethernet cable even though the protocol was not designed for the Ethernet cable or generally uses a different protocol in some embodiments.

In some embodiments, connections are made to system 600 using Ethernet wiring using jacks 612, 614, screw terminals or an RJ45 breakout board or adapter. In some embodiments, crimped Ethernet RJ45 terminations with internal pass-through wiring to multi-drop nodes without any node termination field wiring is used.

In some embodiments, circuit 602 automatically configures system 600 for an end of line configuration if the system is part of an end of line device. Circuit 602 senses for an end of line status and provides the appropriate impedance using impedance circuit 610. Impedance circuit 610 engages a resistive network to provide the appropriate impedance for the end of line status in some embodiments. In some embodiments, the resistive network includes a pull up resistor (e.g., 1200 Ohms), a pull down resistor (e.g., 1200 Ohms), and a shunt resistor (e.g., 220 Ohms) which can be engaged by relays or solid state switches.

End of line status can be sensed by sensor 604 (e.g., using a microswitch in the connectors, by measuring impedance, by providing polling signals to determine the number of connections made to the device, etc.). Circuit 602 can be or include an embedded controller, a hardware circuit, or processor that can analyze signals and/or responses to determine the status in some embodiments.

The system 600 can be coupled to a building power source. The building power source can include a building transformer, building power outlets, etc. Each of the site director system 402, the network switch 404, the network engine 406, the field controller 408, the IOM 410, the sensor 412, and the actuator 414 can be powered via building power of the building power source. In some embodiments, system 600 can use power over Ethernet and receive power from network wiring (e.g., Ethernet and/or RS485 connections) which can exist in addition to power outlets.

In some embodiments, circuit 602 can include control algorithm and/or driver software from a remote system, i.e., from the software update platform 454. In this regard, via a network, e.g., the Internet, Wi-Fi, an on-premises local area network (LAN), etc., the circuit 602 can communicate with the software update platform 454, request a new driver and/or control algorithm, and/or receive the new driver and control algorithms for installation by system 600. The driver can be for one of the internal transceivers 630, 632, and 634.

Circuit 602 can include a processor and a memory. The processor can be a general purpose processor, an application specific integrated circuit (ASIC), one or more field programmable gate arrays (FPGAs), a group of processing components, or other suitable electronic processing components. The processor can be communicatively coupled to the memory. The memory can include one or more devices (e.g., memory units, memory devices, storage devices, etc.) for storing data and/or computer code for completing and/or facilitating the various processes described in the present disclosure. The memory can include random access memory (RAM), read-only memory (ROM), hard drive storage, temporary storage, non-volatile memory, flash memory, optical memory, or any other suitable memory for storing software objects and/or computer instructions. The memory can include database components, object code components, script components, or any other type of information structure for supporting the various activities and information structures described in the present disclosure. The memory can be communicably connected to the processor and can include computer code for executing (e.g., by the processor) one or more processes described herein.

A battery can power circuit 602 and can include a lithium-ion (Li-ion) battery, a nickel cadmium (Ni—Cd), a nickel-metal hydride (Ni-MH) battery, a lead-acid battery, and/or any other type of energy storage device configured to store and discharge energy. Transceivers 630, 632, and 634 can be configured to facilitate communication between system 600 and peripheral building devices. Transceivers 630, 632, and 634 can include a physical interface including one or more signal processing circuits, connectors, etc. Transceivers 630, 632, and 634 can may provide power to peripheral building devices in some embodiments.

System 600 can be part of a controller that may use any of a variety of control algorithms (e.g., state-based algorithms, extremum-seeking control algorithms, proportional algorithms, proportional integral algorithms, PID control algorithms, model predictive control algorithms, feedback control algorithms, etc.) to determine appropriate control actions for any HVAC equipment as a function of temperature and/or humidity. For example, if the ambient temperature of a zone and/or a building (e.g., building 10) is above a temperature set point, the HVAC controller may determine that a cooling coil and/or a fan should be activated to decrease the temperature of supply air delivered to a building zone. Similarly, if the ambient temperature is below the temperature set point, the HVAC controller may determine that a heating coil and/or a fan should be activated to increase the temperature of the supply air delivered to the building zone. The HVAC controller may determine that a humidification or dehumidification component of the HVAC equipment should be activated or deactivated to control the ambient relative humidity to a humidity set point for a building zone and/or the building.

With reference to FIG. 7, a system 700 includes a building controller device 704, and an up/stream/downstream device 702. Device 704 includes a pair of jacks 706 and 708. Device 704 is coupled to device 702 by an Ethernet cable at jack 706. An Ethernet cable is not attached to jack 708. System 600 (FIG. 6) can be employed on device 704 or 702 to engage the appropriate transceiver and engage or disengage the EOL circuit. Devices 702 and 704 both have EOL status and the EOL circuit for both devices 704 and 702 is engaged (e.g., impedance matching provided by circuit 610 (FIG. 6)).

With reference to FIG. 8, a system 800 includes a building controller device 804, an up/stream/downstream device 802, and an up/stream/downstream, device 812. Device 804 includes a pair of jacks 806 and 808. Device 804 is coupled to device 802 by an Ethernet cable at jack 806 and to device 812 via a jack 808 by an Ethernet cable. System 600 (FIG. 6) can be employed on device 812, 804 or 802 to engage the appropriate transceiver and engage or disengage the EOL circuit. Devices 812 and 802 both have EOL status and the EOL circuit for both devices 812 and 814 is engaged. Device 804 does not have EOL status and the EOL circuit is disengaged (e.g., impedance matching not provided by circuit 610 (FIG. 6)).

Figures 9, 10:
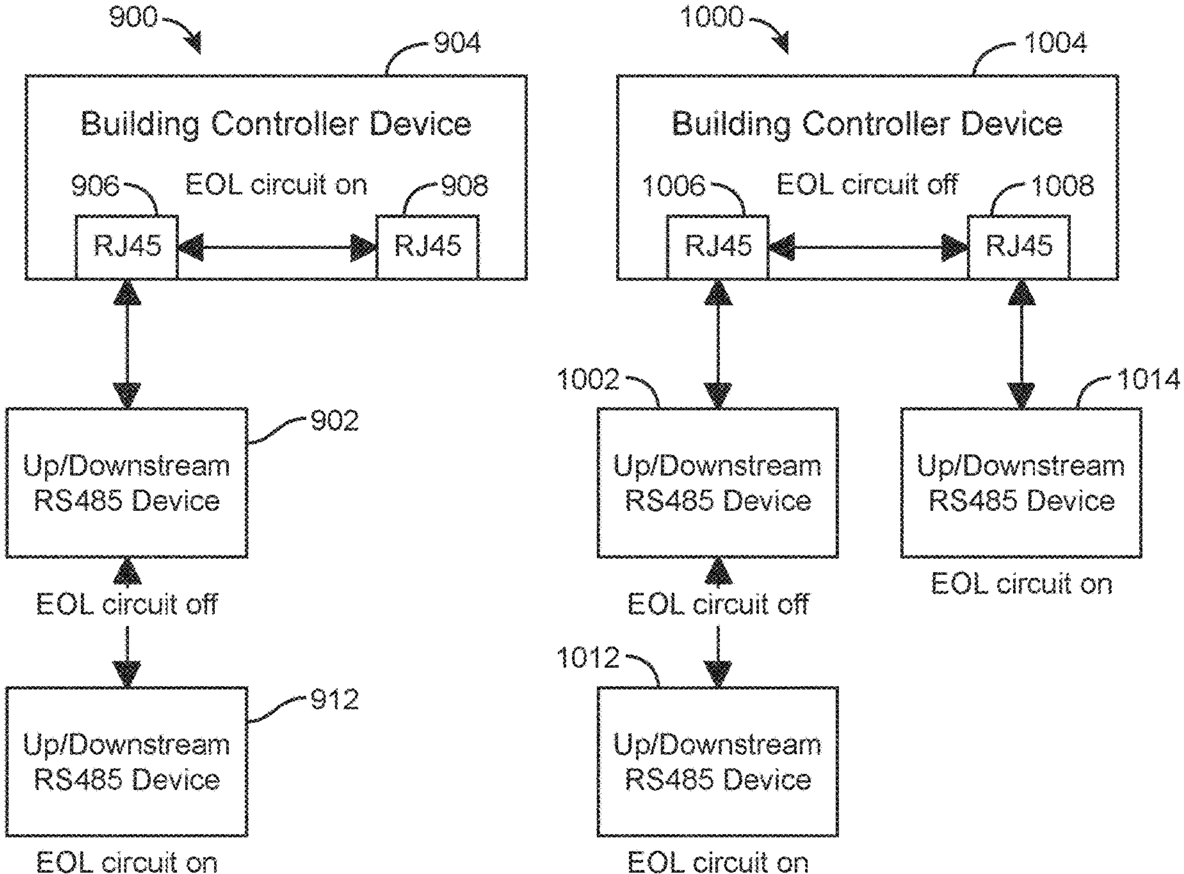
FIG. 9 is a block diagram of a BMS network with a building controller and two upstream/downstream devices, according to some embodiments.
FIG. 10 is a block diagram of a BMS network with a building controller and three upstream/downstream devices, according to some embodiments.

With reference to FIG. 9, a system 900 includes a building controller device 904, an up/stream/downstream device 902, and an up/stream/downstream device 912. Device 904 includes a pair of jacks 906 and 908. Device 904 is coupled to device 802 by an Ethernet cable at jack 906 and device 912 is coupled to device 902 by an Ethernet cable. An Ethernet cable is not attached to jack 908. System 600 (FIG. 6) can be employed on device 912, 904 or 902 to engage the appropriate transceiver and engage or disengage the EOL circuit. Devices 912 and 904 both have EOL status and the EOL circuit for both devices 912 and 904 is engaged. Device 902 does not have EOL status and the EOL circuit is disengaged.

With reference to FIG. 10, a system 1000 includes a building controller device 1004, an up/stream/downstream device 1002, an up/stream/downstream device 1014, and an up/stream/downstream device 1012. Device 1004 includes a pair of jacks 1006 and 1008. Device 1004 is coupled to device 1002 by an Ethernet cable at a jack 1006 and to device 1014 by an Ethernet cable at jack 1008. Device 1012 is coupled to device 1002 by an Ethernet cable. System 600 (FIG. 6) can be employed on devices 1002, 1004, 1012 or 1014 to engage the appropriate transceiver and engage or disengage the EOL circuit. Devices 1002 and 1014 both have EOL status and the EOL circuit for both devices 1002 and 1014 is engaged. Devices 1002 and 1004 do not have EOL status and the EOL circuit is disengaged for devices 1002 and 1004.

Figure 11:
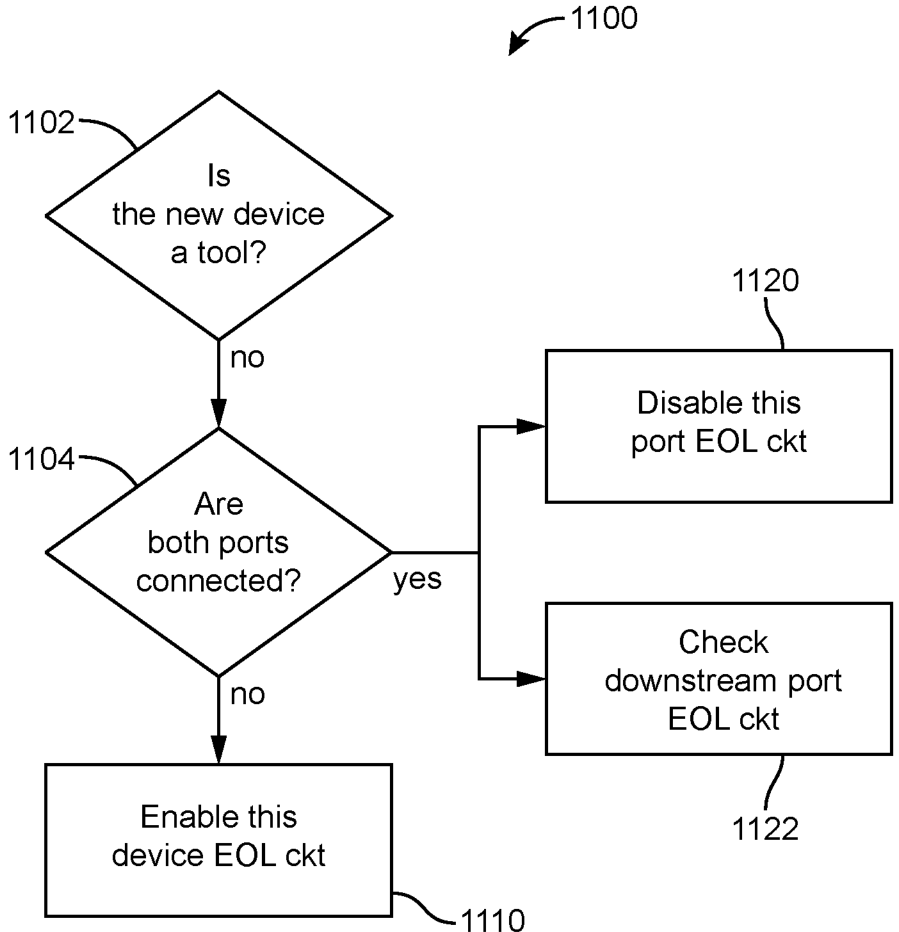
FIG. 11 is a flow diagram of a process of controlling an EOL circuit according to some embodiments.

With reference to FIGS. 6 and 11, a flow 1100 can be used by system 600 for EOL engagement and disengagement. At an operation 1102, system 600 determines if a new device is a tool that has been coupled to the Ethernet wiring. If so, EOL engagement is not necessary and flow 1100 ends or returns to operation 1102 in some embodiments. If not, the new device is a building device and system 600 uses sensor 604 to determine if both ports 612 and 614 are connected. If not, system 600 engages or enables impedance matching using circuit 610 in an operation 1110. If so, system 600 disengages or disables impedance matching using circuit 610 in an operation 1120. In an operation 1122, system 600 can also send a command to have the downstream device perform flow 1100 for possible EOL circuit engagement/disengagement in some embodiments. In some embodiments, system 600 can determine if the downstream device has only one connection and send a command to engage EOL circuit for the downstream device if there is only one connection to the downstream device or a command to disengage EOL circuit for the downstream device if there are two connections to the downstream device in operation 1122.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the word "building" mentioned throughout this document can also be interpreted as an enclosed space such as an airplane or a vehicle. The position of elements can be reversed or otherwise varied and the nature or number of discrete elements or positions can be altered or varied. For example, a host can become a building device and a building device can become a host (role switch) when using/connecting to a "gumstick" or "On-the-Go". The embedded computer can have a processor for decision generation or it may use an external processor located in a cloud and from device such as a "gumstick" or "On-the-Go" device with its own processing capabilities to add features, offload processing from the embedded PC, etc. The peripheral building devices which are connected directly or indirectly to the embedded PC via the host or another connection may include other downstream devices which are connected directly or indirectly to the peripheral building devices. Accordingly, all such modifications are intended to be included within the scope of the present disclosure. The order or sequence of any process or method steps can be varied or re-sequenced according to alternative embodiments. Other substitutions, modifications, changes, and omissions can be made in the design, operating conditions, and arrangement of the exemplary embodiments without departing from the scope of the present disclosure.

The present disclosure contemplates methods, systems, and program products on any machine-readable media for accomplishing various operations. The embodiments of the present disclosure can be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps can be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A method, the method comprising:

determining, using a first building device, a protocol for communicating with a plurality of second building devices in a building system of a building, the second building devices coupled by an Ethernet cable, wherein at least one of the second building devices is coupled to the first building device;

selecting a transceiver from a plurality of transceivers of the first building device based upon the protocol, the plurality of transceivers each being configured for a respective protocol;

communicating with the at least one of the second building devices using the transceiver and the protocol;

determining an end of line status for the first building device; and engaging an end of line circuit in response to the end of line status.

2. The method of claim 1, further comprising:

determining the end of line status for the first device by measuring impedance, providing polling signals, or receiving a microswitch signal.

3. The method of claim 1, wherein the Ethernet cable is coupled to at least one of a pair of jacks on the first device.

4. The method of claim 1, wherein the Ethernet cable is coupled to at least one of a pair of terminal blocks on the first device.

5. A first building device for a building system of a building, the building system comprising second building devices coupled by an Ethernet cable, wherein at least one of the second building devices is coupled to the first building device, the first building device comprising:

a plurality of transceivers each configured for a respective one of a plurality of protocols; and one or more circuits configured to:

connect to the Ethernet cable;

determine a protocol for the second building devices;

select a transceiver from the plurality of the transceivers based upon the protocol; and communicate with the at least one of the second building devices using the transceiver and the protocol, wherein the one or more circuits is configured to:

determine an end of line status for the first device; and engage an end of line circuit in response to the end of line status.

6. The first building device of claim 5, wherein the transceivers are internal transceivers.

7. The first building device of claim 5, wherein the first building device is a controller comprising a pair of jacks.

8. The first building device of claim 3, wherein the jacks are at least one of RJ12, RJ45, or RS485 jacks.

9. The first building device of claim 5, wherein the jacks are configured to receive a plug associated with the Ethernet cable.

10. The first building device of claim 5, wherein the first building device comprises a sensor or actuator comprising a pair of jacks.

11. The first building device of claim 5, wherein the first building device is an air handler unit (AHU) package comprising a pair of jacks.

12. The first building device of claim 5, wherein the one or more circuits is configured to:

determine the end of line status for the first device by measuring impedance, providing polling signals, or receiving a microswitch signal.

13. The first building device of claim 12, further comprising a sensor configured to provide a sense signal indicative of the end of line status or a sensor configured to sense the protocol by sensing a type of plug connected to the jacks.

14. The first building device of claim 7, wherein the jacks are an RJ45 jack and at least one of another type of jack.

15. A first building device for a building system of a building, the building system comprising second building devices coupled by an Ethernet cable, wherein at least one of the second building devices is coupled to the first building device, the first building device comprising:

an end of line circuit; and one or more circuits configured to:

connect to the Ethernet cable;

determine an end of line status for the first building device; and engage the end of line circuit in response to the end of line status.

16. The building system of claim 15, further comprising a pair of jacks for connecting to the Ethernet cable.

17. The first building device of claim 16, further comprising a sensor configured to provide a sense signal indicative of a connection to the Ethernet cable.

18. The first building device of claim 17, wherein the sense signal is provided by a switch disposed in one of the jacks.

19. The first building device of claim 15, wherein the end of line circuit comprises a resistive network coupled to at least one of the jacks.

20. The first building device of claim 19, wherein the resistive network comprises a shunt resistor, a pull up resistor and a pull down resistor.

* * * * *